UNITED STATES PATENT OFFICE.

MOSES G. FARMER, OF NEWPORT, RHODE ISLAND.

FLEXIBLE SHAFT.

SPECIFICATION forming part of Letters Patent No. 312,241, dated February 10, 1885.

Application filed January 8, 1885. (No model.)

*To all whom it may concern:*

Be it known that I, MOSES G. FARMER, a citizen of the United States, and a resident of Newport, in the county of Newport and State of Rhode Island, have invented certain new and useful Improvements in Flexible Shafts, of which the following is a specification, reference being had to the drawing accompanying and forming a part of the same.

My invention is an improvement in shafts or connections for transmitting rotary motion from a motor to a driven machine or from one driven machine to another. My object is to produce a strong, cheap, and flexible shaft for use with machines set at different levels or angles, whereby the motion of one may be transmitted to another without the use of belts and pulleys or other complicated gearing. It is a comparatively easy matter to twist a steel or similar wire into a short spiral, say of from six to nine inches in length; but beyond this it is a matter of great difficulty and expense to form a spiral suitable for use as a flexible shaft and possessing the requisite strength for doing more than very light work. I have, therefore, with the object of making shafts of considerable length, combined two or more short spirals in one shaft, uniting them end to end by means of short metal connections fashioned in the manner hereinafter described.

In the drawing, A A designate the spirals. Each is formed of a stout steel or hardened-iron wire, the size of which will of course depend upon the size of the shaft to be formed or the work which it is to do.

B B are the connections. Each consists of a short metal rod or bar with collars C C. The ends of the rods are inserted into the end of a spiral until the collar thereon abuts against the end of the wire. The convolutions of the wire that surround the bar are then soldered or brazed to the bar. The ends of the shaft consist of sockets D, with binding-screws $d$ and projecting pins E, which are inserted in the spirals and secured thereto in the same manner as the connections B B.

In using the shaft the cups or sockets D are secured to the ends of the shafts or spindles of the machines to be connected, and the screws $d$ are tightened. The number of spirals is arbitrary, and the specific form of the connections and end pieces and the mode of securing together the several parts that compose the shaft may all be very greatly varied.

What I claim is—

1. A flexible shaft composed of two or more short spirals of metal wire united end to end by metal bars, to which the spirals are secured, substantially as set forth.

2. A flexible shaft composed of two or more short spirals of metal wire, in combination with metal bars the ends of which are inserted into the spirals and soldered or brazed to the surrounding convolutions thereof, as set forth.

3. A flexible shaft composed of two or more short spirals of metal wire, in combination with metal bars the ends of which are inserted into the spirals and soldered or brazed to the surrounding convolutions thereof, and end connections consisting of metal sockets provided with a pin that is inserted into and secured to the ends of the spirals in the manner set forth.

In testimony whereof I have hereunto set my hand this 7th day of January, 1885.

MOSES G. FARMER.

Witnesses:
 WILLIAM B. HEATHERTON,
 W. FRISBY.